(12) United States Patent
Janes et al.

(10) Patent No.: US 12,542,464 B2
(45) Date of Patent: Feb. 3, 2026

(54) STATOR ASSEMBLY

(71) Applicant: Caterpillar Inc., Peoria, IL (US)

(72) Inventors: Brian R. Janes, Chillicothe, IL (US);
Andrew A. Friebohle, Pekin, IL (US);
Rodwan T. Adra, Peoria, IL (US);
Nathan A. Kleinschmidt, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 227 days.

(21) Appl. No.: 18/415,147

(22) Filed: Jan. 17, 2024

(65) Prior Publication Data
US 2025/0233470 A1    Jul. 17, 2025

(51) Int. Cl.
*H02K 3/24* (2006.01)
*H02K 1/14* (2006.01)
*H02K 15/022* (2025.01)

(52) U.S. Cl.
CPC .............. *H02K 3/24* (2013.01); *H02K 1/146* (2013.01); *H02K 15/022* (2013.01)

(58) Field of Classification Search
CPC ......... H02K 3/24; H02K 1/146; H02K 15/022
See application file for complete search history.

(56) References Cited

U.S. PATENT DOCUMENTS

| | | | |
|---|---|---|---|
| 4,634,909 A | 1/1987 | Brem | |
| 6,429,563 B1 | 8/2002 | Rothman et al. | |
| 8,157,531 B2 | 4/2012 | Krützfeldt et al. | |
| 9,300,172 B2 | 3/2016 | Dhekane | |
| 11,002,289 B2 | 5/2021 | Baumann et al. | |

FOREIGN PATENT DOCUMENTS

| | | | |
|---|---|---|---|
| CN | 110535273 B | 2/2022 | |
| EP | 3764513 A1 * | 1/2021 | ............. H02K 15/02 |
| EP | 4183030 A1 | 5/2023 | |
| JP | 2006121794 A | 5/2006 | |
| JP | 2012253904 A | 12/2012 | |

* cited by examiner

*Primary Examiner* — Viet P Nguyen
(74) *Attorney, Agent, or Firm* — Bookoff McAndrews PLLC

(57) ABSTRACT

A stator assembly may include a circumferential stator core, which includes a plurality of stator poles, a plurality of stator slots located between adjacent stator poles, and a plurality of conductive coils surrounding a portion of each stator pole, and a coolant wall assembly extending across each stator slot. The coolant wall assembly includes a first bar and a second bar, with each bar extending along a length of the stator poles and having an outer sidewall contacting a stator pole, and an inner sidewall opposite the outer sidewall, the inner sidewalls of the first bar and second bar together forming a central interlock groove; and a central bar extending the length of the stator poles, and located in the interlock groove.

20 Claims, 8 Drawing Sheets ively to the stator 20. Stator 20 includes a circumferential

STATOR ASSEMBLY

TECHNICAL FIELD

The present disclosure relates generally to a rotary electric machine, and more particularly, to a coolant wall for a stator core.

BACKGROUND

Rotary electric machines may be used to power various components of industrial machines, including propelling mobile industrial machines. Such rotary electric machines, for example, a switched reluctance motor, may generate a significant amount of heat during operation. At present, several different cooling solutions are available, including convection cooling systems in which the generated heat is drawn away from the from the rotary electric machines through the use of cooling fluids, such as oil. Enhancing the cooling systems of the rotary electric machines may result in improving the efficiency of the rotary electric machine, increasing the amount of power generated, and extending the life of the rotary electric machine, thereby decreasing user costs.

A cooling system for a switched reluctance motor is described in U.S. Pat. No. 11,002,289 B2, issued on May 11, 2021 ("the '289 patent"). The cooling system described in the '289 patent includes a plurality of cooling channels formed by pairs of adjacent stator coils and a wall extending across each channel. While the cooling system described in the '289 patent may be helpful in some circumstances, the system may be improved.

Aspects of the present disclosure may solve one or more problems in the art. The scope of the current disclosure, however, is defined by the attached claims, and not by the ability to solve any specific problem.

SUMMARY

In one aspect, a stator assembly, including: a circumferential stator core including a plurality of radially inwardly extending stator poles having a length and a width; a plurality of stator slots located between adjacent stator poles and extending the length of the stator poles; a plurality of conductive coils surrounding a portion of each stator pole; and a coolant wall assembly extending between adjacent stator poles at radially inward end portions of the stator pole, the coolant wall assembly including: a first bar and a second bar, each extending the length of the stator poles and having an outer sidewall contacting a stator pole, and an inner sidewall opposite the outer sidewall, the inner sidewalls of the first bar and second bar together forming a central interlock groove; and a central bar extending the length of the stator poles, and located in the interlock groove.

In another aspect, a stator assembly, including: a circumferential stator core including a plurality of radially inwardly extending stator poles having a length and a width; a plurality of stator slots located between adjacent stator poles and extending the length of the stator poles; a plurality of conductive coils surrounding a portion of each stator pole; and a coolant wall assembly extending between adjacent stator poles at radially inward end portions of the stator pole, the coolant wall assembly including: a first bar and a second bar, each being identical to one another, and each extending the length of the stator poles, each of the first and second bars further including: an outer sidewall contacting a stator pole, and an inner sidewall opposite the outer sidewall, the inner sidewalls of the first bar and second bar together forming a central interlock groove; and a central bar extending the length of the stator poles, and located in the interlock groove, the interlock groove forming tapered wall portions for radially securing the central bar in the interlock groove.

In a further aspect, a method for installing a coolant wall assembly within a circumferential stator core, the stator core including a plurality of radially inwardly extending stator poles; a plurality of stator slots located between adjacent stator poles and extending the length of the stator poles; a plurality of conductive coils surrounding a portion of each stator pole; and the coolant wall assembly extending between adjacent stator poles at radially inward end portions of the stator pole, wherein the coolant wall assembly includes a first bar, a second bar, and a central bar, each extending the length of the stator poles, the method including: inserting the first and second bars into respective wall-locating grooves of a stator pole; rotating the first and second outer bars radially outwardly from an open configuration to a closed configuration to form an interlock groove; and inserting the central bar into the interlock groove to secure the coolant wall assembly.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1A:
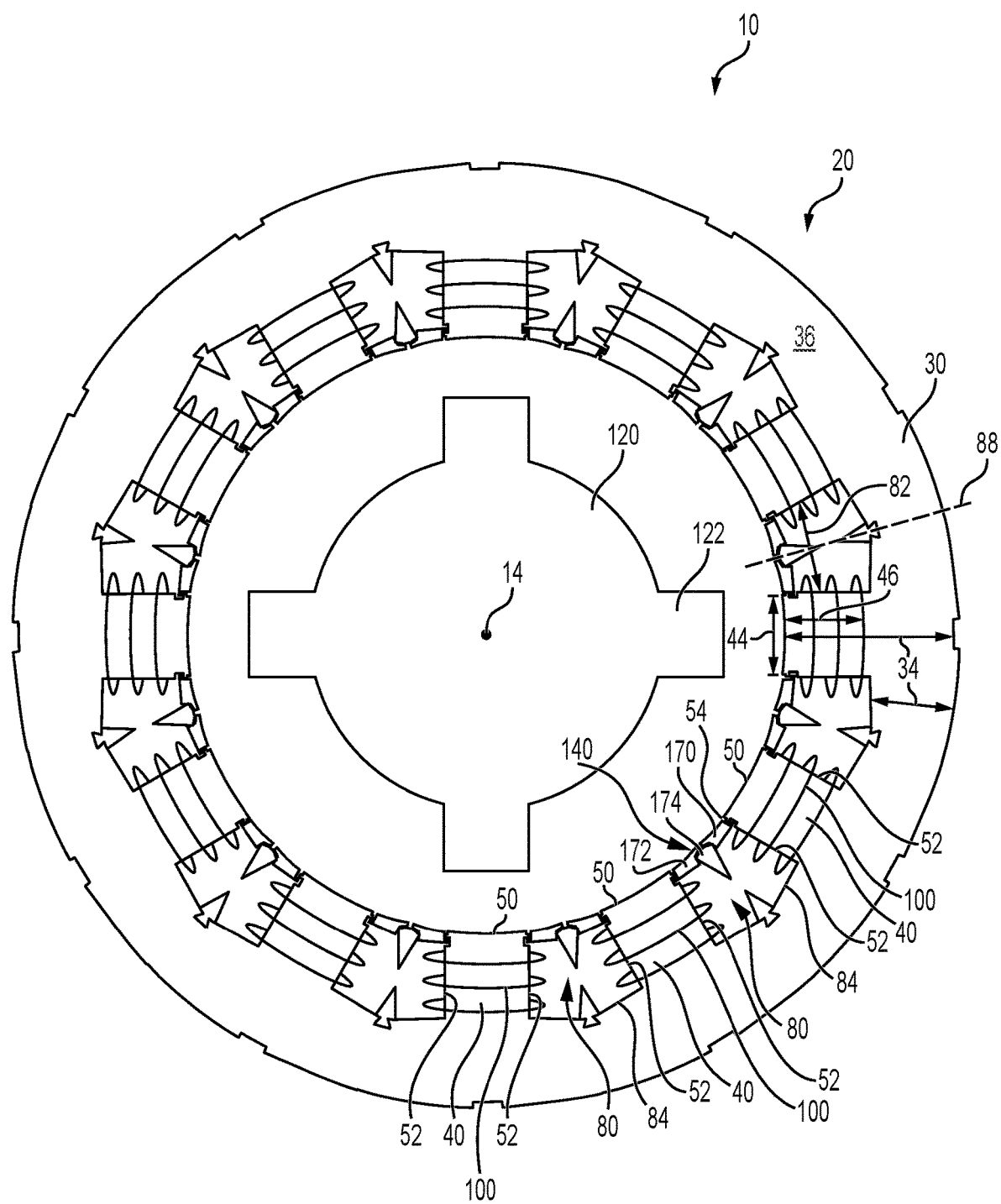
FIG. 1A is a schematic end view of a portion of a rotary electric machine, according to aspects of the disclosure.
Figure 1B:
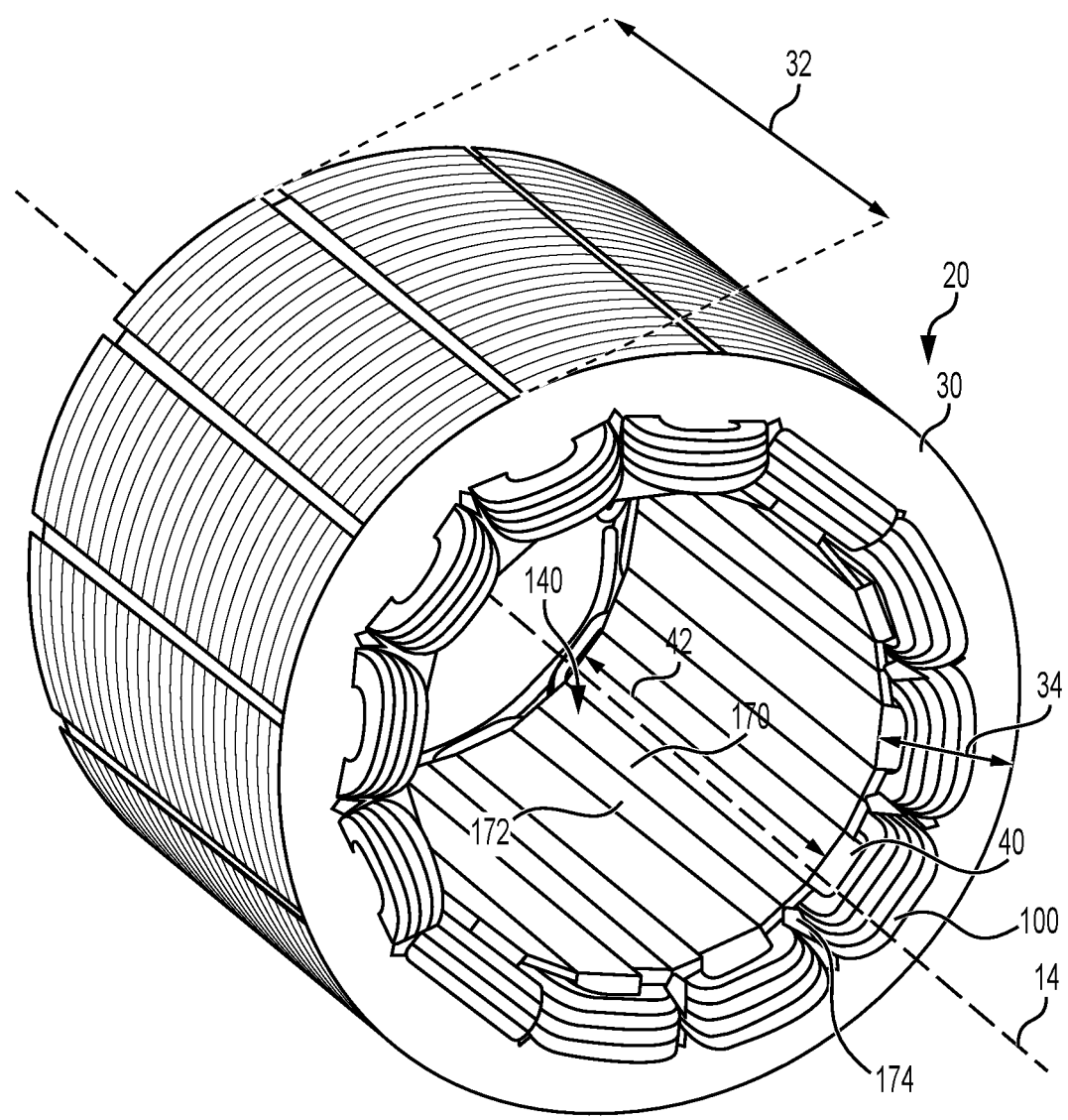
FIG. 1B is a perspective view of a stator of the rotary electric machine of FIG. 1A.

FIGS. 1A and 1B depict a rotary electric machine in the form of a switched reluctance motor 10 that includes a circumferential stator 20, and a rotor 120 that is rotatable relative to the stator 20. Stator 20 includes a circumferential stator core 30, a plurality of radially inwardly extending stator poles 40, and a plurality of conductive coils 100 surrounding at least a portion of each stator pole 40. The stator 20 also includes a plurality of stator slots or channels 80 extending between adjacent stator poles 40, and a coolant wall assembly 140 extending across a radially inner opening 54 of each of the stator slots 80. As will be explained in more detail below, the coolant wall assembly 140 includes a first circumferentially outer bar 170, a second circumferentially outer bar 172, and a circumferentially-central interlock bar 174 joining the first and second outer bars 170, 172.

The stator core 30 includes a length 32 (FIG. 1B) along a longitudinal axis 14 of the switched reluctance motor 10, and a varying radial thickness or width 34 based on the plurality of radially inwardly extending stator poles 40. The rotor 120 includes a plurality of radially outwardly projecting rotor poles 122. The number of phases of the switched reluctance motor 10, as well as the number of stator poles 40 and rotor poles 122, is exemplary only and not intended to be limiting. Furthermore, as shown in FIG. 1B, the stator core 30 may be formed of a stack of vertically laminated iron, one-piece annular members.

Each stator pole 40 projects radially inward towards the central longitudinal axis 14 of the switched reluctance motor 10 and includes a radially inner end face 50 and a pair of oppositely facing side surfaces 52. The stator poles 40 each include a length 42 (FIG. 1B) that extends along the longitudinal axis 14 of the switched reluctance motor 10, and a height 46 that extends radially inward from an inner annular portion 36 of the stator core 30. Each of the stator poles 40 also includes a width 44 between the oppositely facing side surfaces 52 (i.e., a first side surface and a second side surface) of the stator pole 40, and the width 44 is generally constant along the height 46 of an individual stator pole 40, and each stator pole 40 has the same generally constant width, as shown in FIG. 1.

The stator slots 80 of the stator core 30 are angularly positioned between a pair of stator poles 40. The number of stator slots 80 is equal in number to the number of stator poles 40. Like the stator poles 40, the stator slots 80 have a length that extends along the longitudinal axis 14 of the switched reluctance motor 10, and is the same or approximately the same length as the length 42 of stator poles 40. Each stator slot 80 includes a radially outer surface or wall 84 formed by annular portion 36 of stator core 30, and the stator slots 80 open towards rotor 120. Due to the circular cross-section of the stator 20, and the generally constant width 44 of each stator pole 40, each stator slot 80 includes a width 82 that tapers or narrows in a generally uniform or linear manner from the outer wall 84 of the stator slot 80 towards the radially inner opening 54 of the stator slot 80. A centerline 88 of each stator slot 80 extends between the adjacent pairs of stator poles 40 radially through the stator slot 80.

Figure 2A:
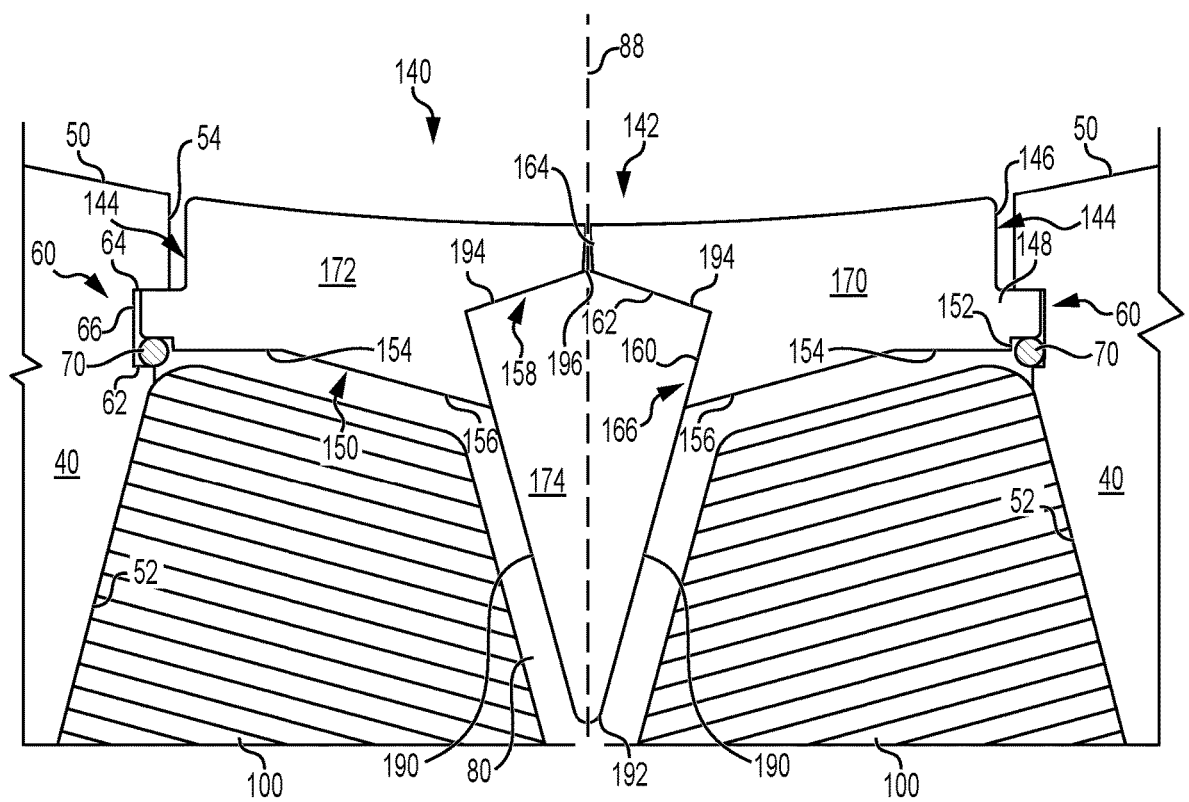
FIG. 2A is an end view of a coolant wall assembly of the stator of the rotary electric machine of FIG. 1.

As noted above and depicted in FIGS. 1A and 1B, each stator pole 40 includes a conductive winding or coil 100 that is wrapped around the stator poles 40. As shown in FIG. 2A, much of the stator slot 80 is filled by conductive coils 100. The conductive coils 100 are positioned about the stator poles 40 of each group of a phase set (i.e., A+, A– and B+, B–), which are electrically connected and may be configured as part of an electrical circuit, either in parallel or in series. The conductive windings or coils 100 extend a majority of the height 46 of the stator pole 40, but do not extend all the way to the radial inner end face 50 (top) of the stator pole 40, so as to leave room for a coupling for lubricating wall assembly 140, as will be explained in more detail below.

The rotor 120 of the switched reluctance motor 10 does not include windings or magnets. The rotor 120 may be formed of a stack of vertically laminated iron, one-piece annular members (not shown) similar to rotor core 30. Rotor 120 may have additional or alternative structures and/or configurations. In addition, while the rotary electric machine of FIG. 1 is depicted as a switched reluctance motor 10, the concepts disclosed herein are applicable to other rotary electric machines such as a switched reluctance generator or a machine having a rotor 120 having permanent magnets or some other structure or configuration.

Referring to FIG. 2A, the stator poles 40 each include a wall-locating groove 60 on each side surface 52 of stator pole 40. The wall-locating groove 60 extends lengthwise along each of the oppositely facing side surfaces 52 of the stator pole 40. In one example, the wall-locating grooves 60 may be adjacent and slightly spaced radially-outwardly from radial inner end face 50 of the stator pole 40, and radially inward from a corresponding conductive coil 100 located on stator pole 40. Each of the wall-locating grooves 60 opens toward the stator slot 80 and includes a generally rectangular shape. For example, wall-locating grooves 60 may include a top or radially inner planar wall 64, a back or radially outer planar wall 66 extending perpendicular to the top planar wall 64, and a radially outer step 62. While the wall-locating grooves may include a generally rectangular shape as shown in FIG. 2A, the back planar wall 66 may include a rounded corner at the transition to radially outer step 62.

The wall-locating grooves 60 receive a sealing member 70 (shown in cross-section in FIG. 2A), located on the radially outer step 62 of the wall-located groove 60. For example, the sealing member may include an O-ring encircling an individual stator pole 40 and be secured within the wall-locating grooves 60 to the stator poles 40. The O-ring may be formed of an elastomeric material, or any other appropriate material. Also, while an O-ring is shown in FIG. 2A, the sealing member 70 may have an alternative shape (e.g., a length or strip of sealing material, and/or a non-circular cross-section) and may be formed of a different material.

Still referring to FIGS. 1 and 2A, the coolant wall assembly 140 extends between and across the radially inner opening 54 of each of stator slots 80—bridging adjacent pairs of stator poles 40. The coolant wall assembly 140 extends along the length 32 of the stator core 30. As noted above and shown individually in FIGS. 2B and 2C, the coolant wall assembly 140 may be made of up a first and a second circumferentially outer bars 170, 172, and a circumferentially-central interlock bar 174. The center interlock bar 174 is coupled to the outer bars 170 in a dovetail-type mating.

When the coolant wall assembly 140 is assembled, as shown in FIG. 2A, the coolant wall assembly 140 includes a radially inner face 142 facing the rotor 120, a pair of outer sidewalls 144, and a radially outer face 150 facing the stator slot 80. The radially inner face 142 forms a generally planar or slightly concave surface that is approximately coextensive with the radially inward end faces 50 of stator poles 40. The pair of outer sidewalls 144 of coolant wall assembly 140 include a generally planar radially inner face 146 and a radially inner ledge or step 148 at a radially outer portion of the sidewall 144. The radially inner face 146 is generally perpendicular to both the radially inner face 142 and the ledge or step 148 of the coolant wall assembly 140. The radially outer face 150 of coolant wall assembly 140 may also include a seal member groove or step 152, and planar portions 154, 156 extending on each side of central interlock bar 174. The central interlock bar 174 extends radially outwardly into the stator slot 80 in a gap between the plurality of conductive windings or coils 100.

Figure 2B:
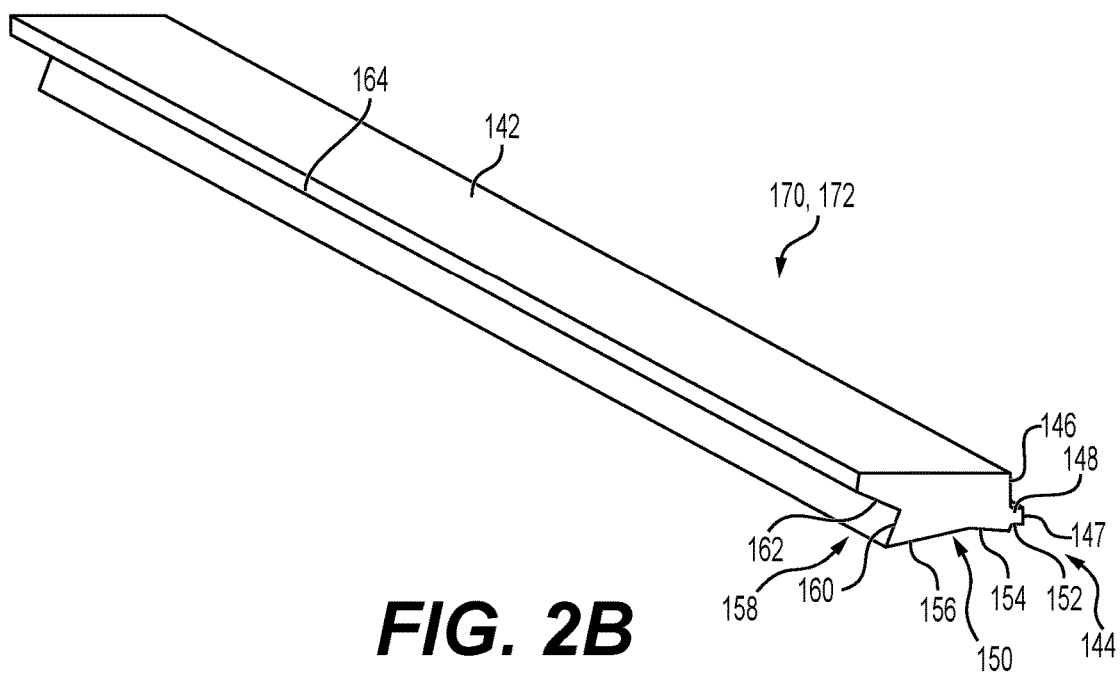
FIG. 2B is a perspective view of an outer bar of the coolant wall assembly of FIG. 2A.

As noted above, the coolant wall 140 assembly may be made up of a first and second outer bars 170, 172 and a circumferentially-central interlock bar 174. The first circumferentially outer bar 170 and the second circumferentially outer bar 172 may be structurally identical, and together form the various faces listed above (e.g., the radially inner face 142, the pair of outer sidewalls 144, and portions of the radially outer face 150). Referring to FIG. 2B, each of the outer bars 170, 172 may individually include the radially inner face 142, an outer sidewall 144, and the planar portions 154, 156. In addition, the individual outer bars 170, 172 may include an inner sidewall 158 for mating with a portion of central interlock bar 174. Inner sidewall 158 may include three walls or surfaces, including a radially inner, planar, and radially-extending wall 164 extending generally perpendicular to radially inner face 142, a radially inner, angled, and planar wall 162, and a radially outer, angled, and planar wall 160. The radially inner angled wall 162 extends at an obtuse angle relative to radially extending wall 164, and forms a slightly obtuse angle with the radially outer planar wall 160. It is understood that other angles between the walls of the inner sidewall 158 are contemplated. Radially outer wall 160 angles radially outwardly toward centerline 88 of stator slot 80, thereby forming with the adjoining outer bar 174 an interlock groove 166 (FIG. 4B) for receiving center interlock bar 174. Based on the angled planar walls 160 of the outer bars 170, 172, the interlock groove 166 forms a tapered portion tapering in a radially outwardly direction, and the tapered portion serves to radially secure the central bar 174 in the interlock groove 166.

Figure 2C:
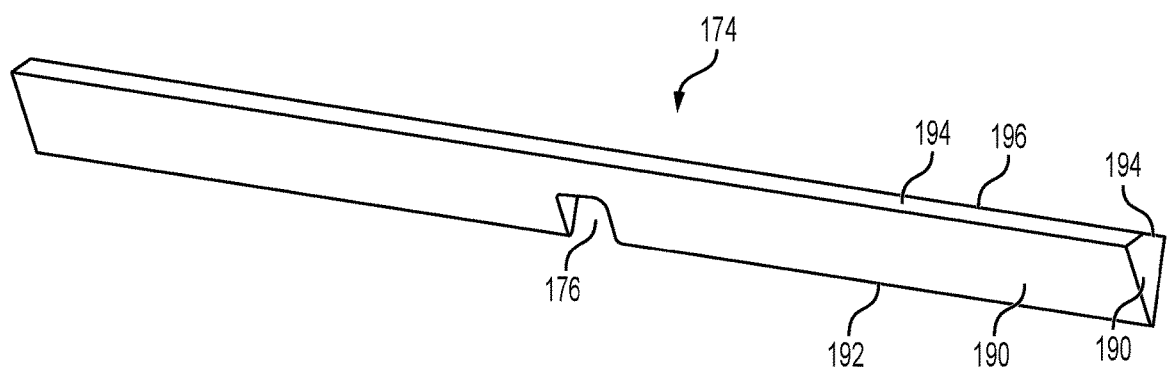
FIG. 2C is a perspective view of a central bar of the coolant wall assembly of FIG. 2A.

As shown in FIGS. 2A and 2C, the circumferentially-central interlock bar 174 of the coolant wall assembly 140 may extend along the length 42 of the stator poles 40. The circumferentially-central interlock bar 174 includes a transverse groove or notch 176, which may be formed in a molded part, or machined or removed, at a longitudinal midpoint for coolant deflection. The circumferentially-central bar 174 may have a generally spear-shaped cross-section to match the interlock groove 166 formed by the outer bars 170, 172. In particular, central interlock bar 174 may include a cross-section having four walls including pair of sidewalls 190 tapering to a radially outward apex 192, and a pair of radially inner walls 194 tapering to an apex 196. When interconnected with the outer bars 170, 172, the cross-section of central bar 174 may be described as a pair of acute triangles mirrored about centerline 88 of stator slot 80, with apex 192 forming a protrusion radially outwardly into a respective stator slot 80.

The outer bars 170, 172, and the circumferentially-central interlock bar 174 may be formed of a thermally and electrically insulative material such as plastic or resin, or any other appropriate material.

INDUSTRIAL APPLICABILITY

The disclosed aspects of the coolant wall assembly 140 for the stator 20 of the present disclosure may be used to assist the cooling of electric rotary machines, such as motors or generators. In particular, the coolant wall assembly 140 may assist in maintaining cooling fluid within stator slots 80 of a stator 20 of a switched reluctance motor 10.

Figure 3:
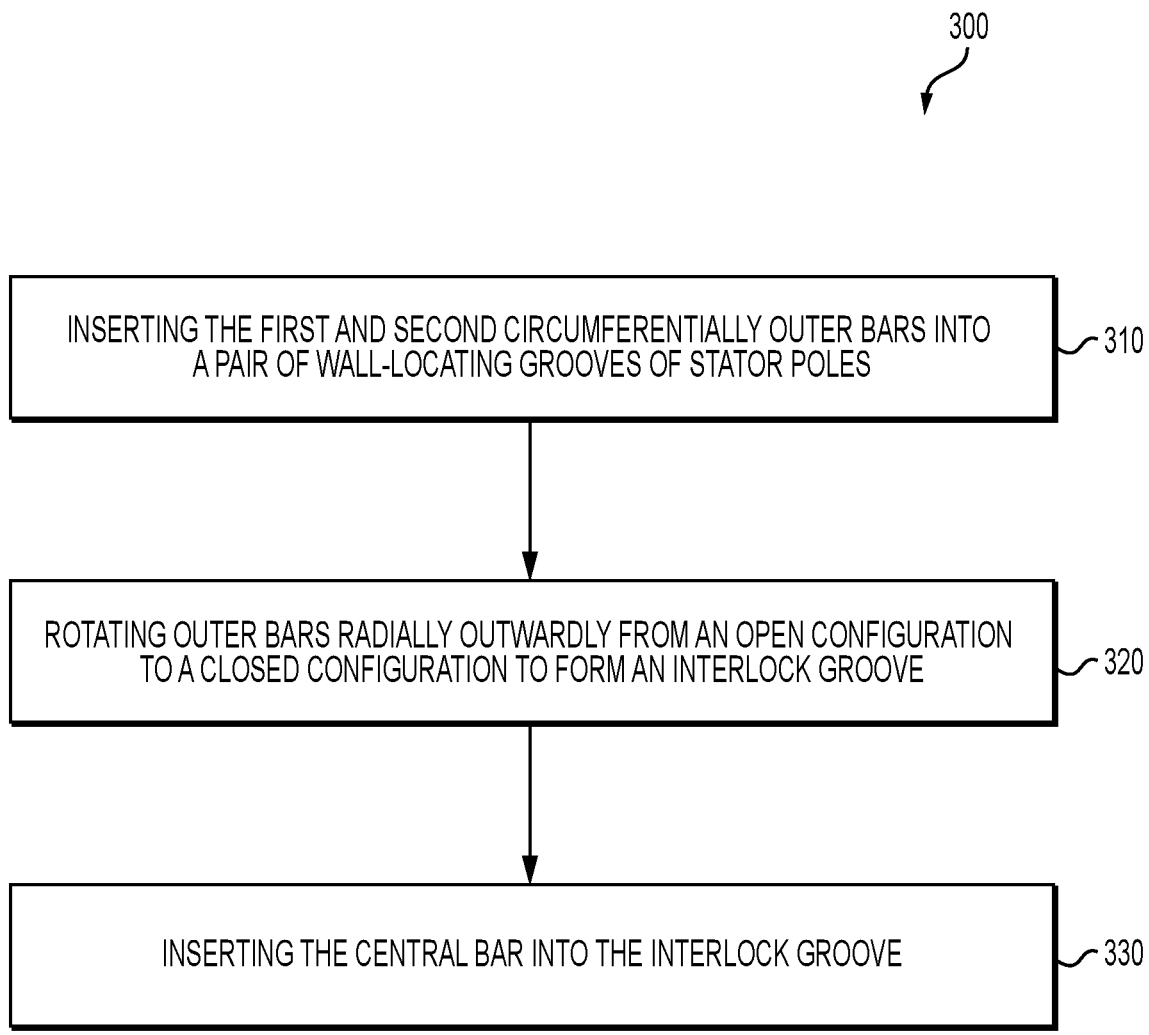
FIG. 3 provides a flowchart depicting an exemplary method for installing a coolant wall assembly into a stator slot of the rotary electric machine of FIG. 1A.
Figure 4A:
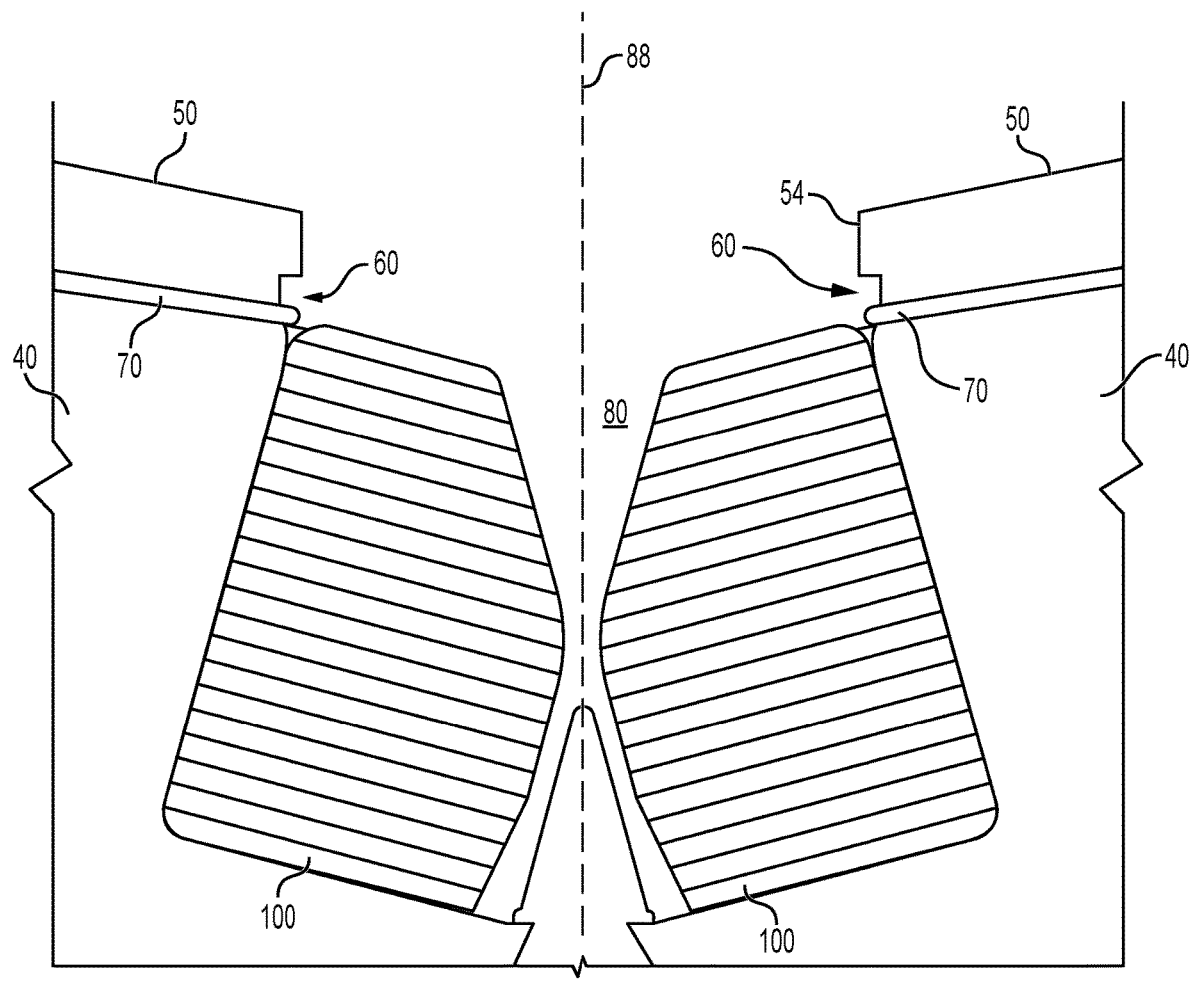
FIGS. 4A-4C depict the insertion of the coolant wall assembly into a stator of the rotary electric machine of FIG. 1A.
Figure 4B:
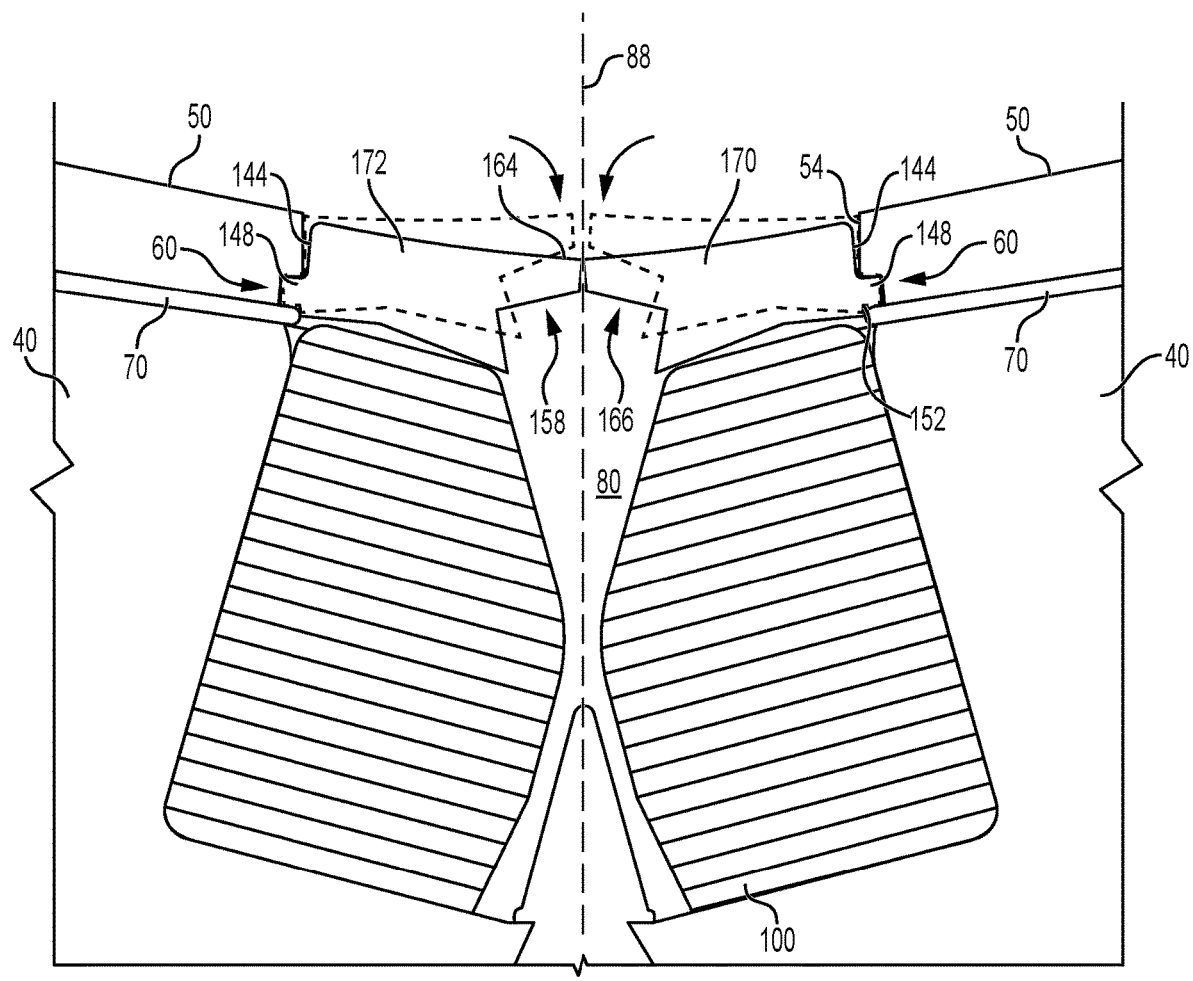
Figure 4C:
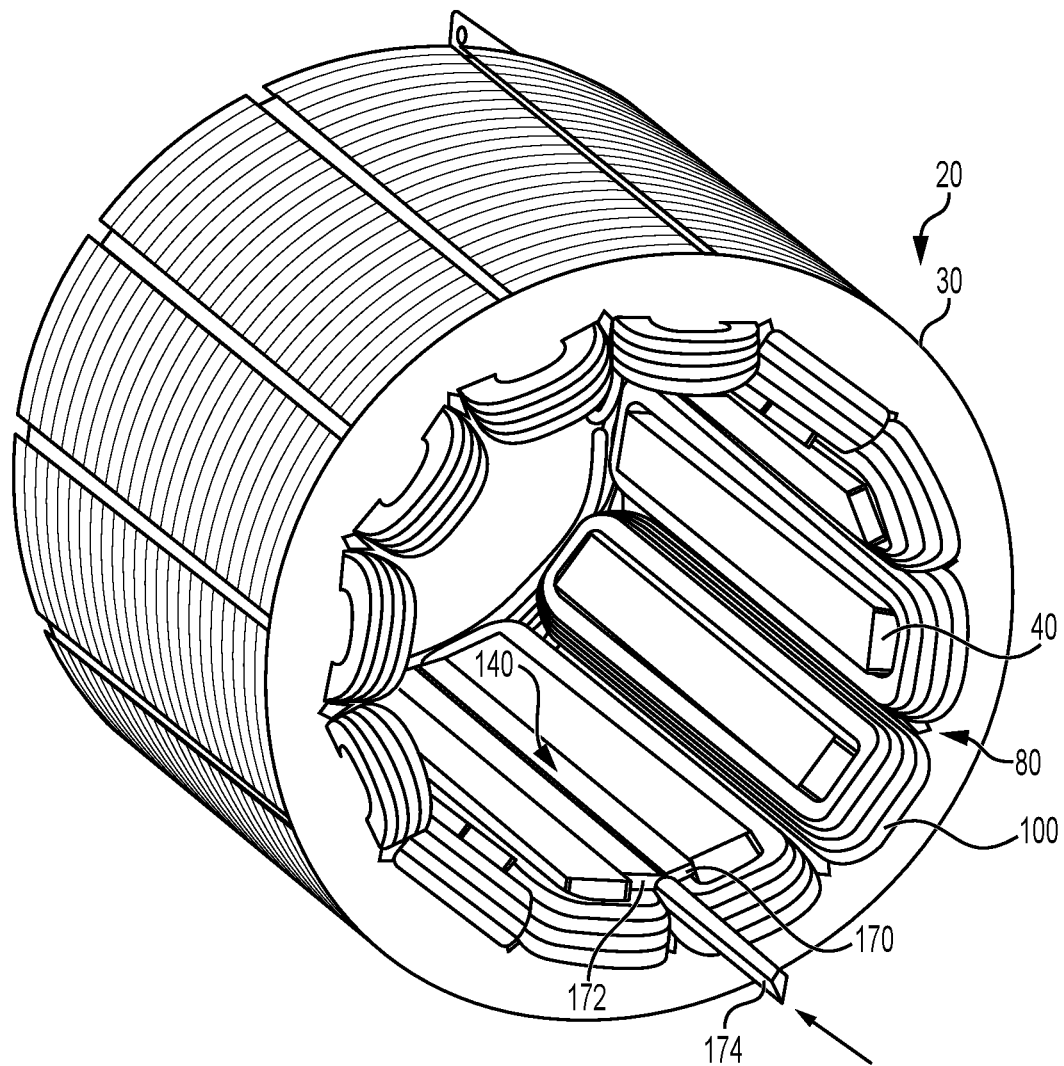

FIG. 3 illustrates an example method 300 for installing a coolant wall assembly 140, including first outer bar 170, second outer bar 172, and circumferentially-central interlock bar 174, into a plurality of stator slots 80 between a plurality of stator poles 40 within rotary electric machine 10. FIGS. 4A-4C depict structurally the method of FIG. 3. FIG. 4A shows the stator 20 prior to insertion of the coolant wall assembly 140. The method 300 includes a step 310 of inserting sidewall 144 of both the first and second circumferentially outer bars 170, 172 into the pair of wall-locating grooves 60 on opposite sides of an individual stator slot 80. In particular, and as shown in FIG. 4B, the ledge 148 of the sidewalls 144 of the outer bars 170, 172 may be inserted in the wall-locating grooves 60 above the sealing member 70 such that sealing member 70 is received in seal member groove or step 152. The sealing member 70 may be biased by the insertion of the radially ledge 148 into the wall-locating grooves 60, thereby forming a sealing joint between the stator poles 40, and the outer bars 170, 172. In this open or insertion position, the inner sidewalls 158, 166 of the outer bars 170, 172 are raised and extend radially inwardly as shown in dashed lines in FIG. 4B (akin to an open drawbridge). As an optional step of the method 300, additional sealing may be provided by including a layer of resin or adhesive applied to the wall-locating grooves 60 prior to the step of inserting the ledge 148 of the first and second outer bars 170, 172.

Step 320 of the method 300 (shown structurally in FIG. 4B) involves rotating or pivoting the outer bars 170, 172 about the ledge 148 and aligning the radially-extending walls 164 of the bars 170, 172 from the open configuration (dashed lines) to a closed configuration (solid lines). In the closed configuration, the inner sidewalls 158, 166 of the outer bars 170, 172 are pushed downward or radially outward towards the conductive coils 100, such that the radially-extending walls 164 are opposing and adjacent one another, and contact or almost contact each other. The seal member step 152 further biases the sealing member 70 and the ledge 148 fully received within the wall-locating grooves 60. In the close configuration, the interlock groove is formed by the inner sidewalls 158, 166 of the outer bars 170, 172 to receive the complementary-shaped central interlock bar 174.

In step 330 of the method 300, the central interlock bar 174 is inserted or slid into the interlock groove 166 formed by the opposing radially-inner planar walls 160 and radially-outer planar walls 162 of the bars 170, 172. During this step, the central bar 174, which is shaped to be received within the central wedge formed by the inner sidewalls 158, 166, forms mating fit with the first and second outer bars 170, 172 resulting in sealed coupling. The central bar 174 may be inserted into the interlock groove 166 either manually or with the aid of an appropriate tool.

In accordance with the present disclosure, the coolant wall assembly 140 of the stator 20 may facilitate the function of a rotary electric machine by providing a coolant wall assembly 140 that creates a robust seal for containing cooling oils utilized within the stator 20, while minimizing wear on the bars 170, 172, and especially the ledges 148, of the assembly 140. The coolant wall assembly 140 of the current disclosure may help in eliminating potential gaps or leak points where coolant can escape the stator slots 80. Further, the multiple bars 170, 172, 174 of the coolant wall assembly 140, and insertion method, allow for more tolerance variations across the members.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A stator assembly, comprising:
   a circumferential stator core including a plurality of radially inwardly extending stator poles having a length and a width;
   a plurality of stator slots located between adjacent stator poles and extending the length of the stator poles;
   a plurality of conductive coils surrounding a portion of each stator pole; and
   a coolant wall assembly extending between adjacent stator poles at radially inward end portions of the stator pole, the coolant wall assembly including:
      a first bar and a second bar, each extending the length of the stator poles and having an outer sidewall contacting a stator pole, and an inner sidewall opposite the outer sidewall, the inner sidewalls of the first bar and second bar together forming a central interlock groove; and
      a central bar extending the length of the stator poles, and located in the interlock groove.

2. The stator assembly of claim 1, wherein each stator pole includes a wall groove extending lengthwise at the radially inward end portions, and a ledge of the first bar and second bar are located in a respective groove.

3. The stator assembly of claim 2, each groove includes a sealing member.

4. The stator assembly of claim 1, wherein the interlock groove includes a tapering portion tapering in a radially outward direction.

5. The stator assembly of claim 2, wherein the first bar and the second bar have adjacent and opposing walls radially inward of the interlock groove.

6. The stator assembly of claim 1, wherein the first bar and the second bar are identical.

7. The stator assembly of claim 1, wherein the central bar includes an apex protruding radially outwardly into a respective stator slot.

8. The stator assembly of claim 1, wherein the central bar includes a generally spear-shaped cross-sectional shape.

9. The stator assembly of claim 1, wherein the central bar includes a notch at a midpoint along its length.

10. The stator assembly of claim 1, wherein the first bar, the second bar, and the central bar are formed of a thermally and/or electrically insulative material.

11. A stator assembly, comprising:
    a circumferential stator core including a plurality of radially inwardly extending stator poles having a length and a width;
    a plurality of stator slots located between adjacent stator poles and extending the length of the stator poles;
    a plurality of conductive coils surrounding a portion of each stator pole; and
    a coolant wall assembly extending between adjacent stator poles at radially inward end portions of the stator pole, the coolant wall assembly including:
       a first bar and a second bar, each being identical to one another, and each extending the length of the stator poles, each of the first and second bars further including:
          an outer sidewall contacting a stator pole, and
          an inner sidewall opposite the outer sidewall, the inner sidewalls of the first bar and second bar together forming a central interlock groove; and
       a central bar extending the length of the stator poles, and located in the interlock groove, the interlock groove forming tapered wall portions for radially securing the central bar in the interlock groove.

12. The stator assembly of claim 11, wherein the stator poles each include a wall-locating groove that receives a sealing member therein.

13. The stator assembly of claim 12, wherein the wall-locating grooves each include a ledge included on the outer wall of a respective first or second bar.

14. The stator assembly of claim 13, wherein the ledge is located radially inwardly of the sealing member.

15. The stator assembly of claim 12, wherein the first bar and the second bar have adjacent and opposing walls radially inward of the interlock groove.

16. The stator assembly of claim 11, wherein the central bar includes an apex protruding radially outwardly into a respective stator slot.

17. The stator assembly of claim 11, wherein the central bar includes a generally spear-shaped cross-sectional shape.

18. The stator assembly of claim 11, wherein the central bar includes a notch at a midpoint along its length.

19. The stator assembly of claim 11, wherein the first bar, the second bar, and the central bar are formed of a thermally and/or electrically insulative material.

20. A method for installing a coolant wall assembly within a circumferential stator core, the stator core including a plurality of radially inwardly extending stator poles; a plurality of stator slots located between adjacent stator poles and extending a length of the stator poles; a plurality of conductive coils surrounding a portion of each stator pole; and the coolant wall assembly extending between adjacent stator poles at radially inward end portions of the stator pole, wherein the coolant wall assembly includes a first bar, a second bar, and a central bar, each extending the length of the stator poles, the method comprising:
    inserting the first bar and the second bar into respective wall-locating grooves of a stator pole;
    rotating the first bar and the second bar radially outwardly from an open configuration to a closed configuration to form an interlock groove; and
    inserting the central bar into the interlock groove to secure the coolant wall assembly.

* * * * *